US012794902B2

(12) United States Patent
Sreepada et al.

(10) Patent No.: US 12,794,902 B2
(45) Date of Patent: Nov. 10, 2026

(54) CUSTOM EMAIL VALIDATION FOR WEB APPLICATIONS

(71) Applicant: ADP, INC, Roseland, NJ (US)

(72) Inventors: Kranthi Kumar Sreepada, Hyderabad (IN); Sai Kumar Prabhala, Hyderabad (IN); Hari Kishore Jammalamadaka, Hyderabad (IN); Veerender Munavath, Hyderabad (IN); Baswanth Rao Karnate, Hyderabad (IN)

(73) Assignee: ADP, INC, Roseland, NJ (US)

( * ) Notice: Subject to any disclaimer, the term of this patent is extended or adjusted under 35 U.S.C. 154(b) by 15 days.

(21) Appl. No.: 19/063,394

(22) Filed: Feb. 26, 2025

(65) Prior Publication Data

US 2026/0180996 A1 Jun. 25, 2026

(30) Foreign Application Priority Data

Dec. 23, 2024 (IN) ............................ 202441101949

(51) Int. Cl.
*H04L 9/40* (2022.01)

(52) U.S. Cl.
CPC .................................. *H04L 63/123* (2013.01)

(58) Field of Classification Search
CPC ....... H04L 63/123; H04L 51/08; H04L 51/21; H04L 63/12; G06Q 10/107
See application file for complete search history.

(56) References Cited

U.S. PATENT DOCUMENTS 8,844,013 B2 9/2014 Vangpat et al.
9,143,497 B2 * 9/2015 Enderwick ............ H04L 63/145
9,559,997 B1 * 1/2017 Everton ................ H04L 51/212
10,560,412 B2 * 2/2020 Smith ................... H04L 51/214
10,701,007 B2 * 6/2020 Loh ......................... H04L 63/08
11,258,759 B2 * 2/2022 Goldstein ............. H04L 63/101
11,265,376 B2 * 3/2022 Dennis ..................... H04L 51/42
11,699,134 B2 * 7/2023 Khwaja .............. G06Q 10/1093 705/7.18
11,770,353 B2 * 9/2023 Sachtjen ............... H04W 12/06 709/206
12,019,741 B2 * 6/2024 Kras .................. G09B 19/0053
12,074,842 B2 * 8/2024 Kras ..................... H04L 9/0833

(Continued)

OTHER PUBLICATIONS

European Search Report in European Patent Application EP 25223501.5, dated May 21, 2026, European Patent Office, Munich, Germany, pp. 1-8.

*Primary Examiner* — Hosuk Song
(74) *Attorney, Agent, or Firm* — Hussey IP, LLC

(57) ABSTRACT

Systems and methods are provided to integrate an email validation application with a web application. A custom email composer of the web application may include a context identifier in a draft email, where the context identifier identifies an issue activity log. The email validation application may validate the draft email in response to a validation request received from the custom email composer, where the validation request includes the context identifier. A custom backend component of the web application may write a validation status to the issue activity log in response to receipt of the validation status from the email validation application. The custom backend component may send the draft email in response to the validation status indicating the draft email is validated.

20 Claims, 15 Drawing Sheets

(56) References Cited

U.S. PATENT DOCUMENTS

| | | | | |
|---|---|---|---|---|
| 12,284,149 | B2 * | 4/2025 | Sachtjen | H04W 12/069 |
| 2015/0180822 | A1 | 6/2015 | Mathias et al. | |
| 2019/0268292 | A1 | 8/2019 | Manning et al. | |

* cited by examiner

302

900

CUSTOM EMAIL VALIDATION FOR WEB APPLICATIONS

CROSS-REFERENCE TO RELATED APPLICATIONS

This application claims priority under 35 USC § 119 to Indian Provisional Patent Application No. 202441101949, filed Dec. 23, 2024, which is hereby incorporated by reference.

TECHNICAL FIELD

This application relates to email validation and, in particular, to integration of email validation applications with web applications.

BACKGROUND

Present web applications systems offering email functionality suffer from a variety of drawbacks, limitations, and disadvantages. Accordingly, there is a need for inventive systems, methods, components, and apparatuses described herein.

BRIEF DESCRIPTION OF THE DRAWINGS

The examples may be better understood with reference to the following drawings and description. The components in the figures are not necessarily to scale. Moreover, in the figures, like-referenced numerals designate corresponding parts throughout the different views.

DETAILED DESCRIPTION

In one example, a method of integrating an email validation application with a web application is provided. A custom email composer of the web application may compose a draft email based on user input. The draft email may be associated with a context identifier that identifies an issue activity log. As an example, the context identifier may be an email threading token, and the issue activity log may be a case, which may be a collection of information about a customer's issue, inquiry, or incident. The custom email composer may request validation of the draft email by transmitting a validation request to the email validation application. The validation request may include, for example, a HyperText Transfer Protocol request (HTTP request) comprising the context identifier. The email validation application may validate the draft email in response to the validation request. A validation status may be transmitted from the email validation application to the web application, where the validation status includes the context identifier and a result of the validation request. The web application may update the issue activity log with the validation status in response to receipt of the validation status. The web application may send the draft email in response to the validation status indicating the draft email is validated.

One technical advantage of the systems and methods described below may be that email validations may be added to web applications that provide email functionality even where the web applications may not be customizable due to license constraints, being located on servers not under a licensee's control, or for any other reason.

Figure 1:
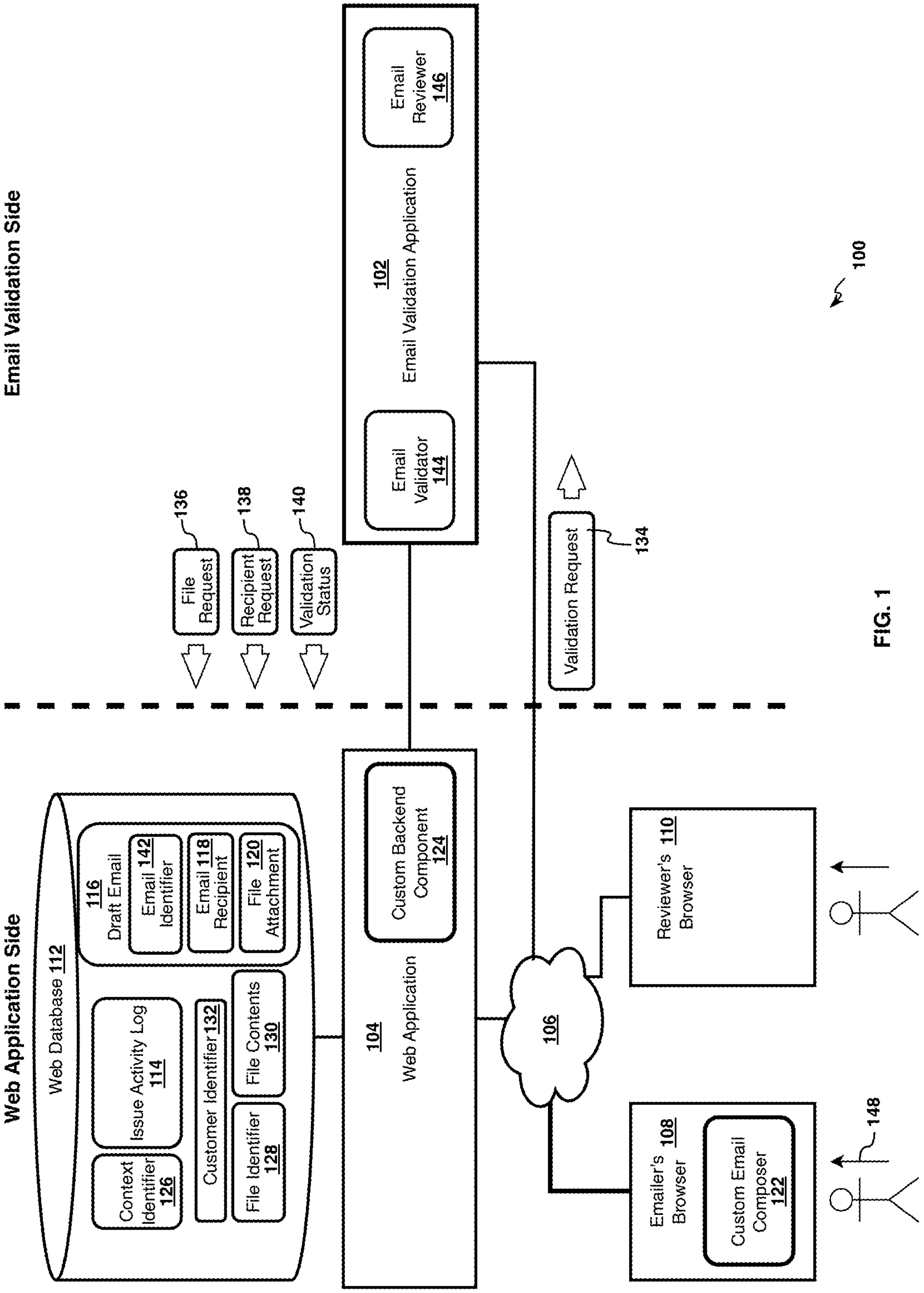
FIG. 1 illustrates an example of a system to integrate an email validation application with a web application.

FIG. 1 illustrates an example of a system 100 to integrate an email validation application 102 with a web application 104. The web application 104 may be any web-based application that tracks customer issues and that provides an ability to compose and send emails. For example, the web application 104 may be a customer relationship management application, an issue tracker system, a bug tracker application, a trouble ticket application, or any other issue tracking application having the ability to compose and send emails. In some examples, the web application 104 may comprise two or more applications integrated together. Examples of customer relationship management applications and issue tracker applications may include SALESFORCE (SALESFORCE is a registered trademark of Salesforce, Inc. of San Francisco, California), EngageBay, HUBSPOT (HUBSPOT is a registered trademark of HubSpot, Inc. of Cambridge, MA), JIRA (JIRA is a registered trademark of Atlassian Pty Ltd), Bugzilla, and MantisBT.

As with any web application, the web application 104 is accessed over a network 106 by one or more web browsers. In FIG. 1, two web browser instances are shown for illustrative purposes only, namely, an emailer's browser 108 and a reviewer's browser 110.

In the illustrated example, the web application 104 persists objects in a web database 112. The web application 104 may store, for example, issue activity logs, such as an issue activity log 114, and draft emails, such as a draft email 116, in the web database 112.

The issue activity log 114 may be a list of activities associated with an issue that a customer may have. The issue may have been reported by the customer and, in response, the web application 104 may create the issue activity log 114 for recording activities related to the issue. The issue activity log 114 may be a case, which may be a collection of information about the issue, such as a customer's issue, inquiry, or incident. In some examples, the issue activity log 114 may operate as a timeline, displaying posts, comments, and/or relevant activities from individuals or groups in chronological order. For example, the issue activity log 114 may be a chat feed, such as a CHATTER feed (CHATTER is a registered trademark of Salesforce, Inc. of San Francisco, California) in a SALESFORCE Customer Relationship Management application. A chat feed may include a chronological display of messages within a chat conversation viewable within the web application 104.

As mentioned above, the web application 104 provides an ability to compose and send emails. However, the web application 104 may not provide the type of validations of the emails that are desired by users of the web application 104. For example, a type of validation desired may be to verify that each email recipient 118 of the draft email 116 is an authorized email recipient for the customer having the issue reported by the customer. As another example, a type of validation desired may be to verify that each file attachment 120 of the draft email 116 is approved for all email recipients of the draft email 116.

Nevertheless, there may be other applications, such as the email validation application 102 in FIG. 1, that are available or that may be developed that provide the validations desired by the users. The system 100 shown in FIG. 1 is a novel system to integrate the email validation application 102 with the web application 104. The system 100 includes the email validation application 102 itself and, on the web application side, a custom email composer 122 and a custom backend component 124. The custom email composer 122 may enable creation of the draft email 116 and request the email validation application 102 to validate of the draft email 116. The custom email composer 122 may execute in the emailer's browser 108. The custom backend component 124 may provide one or more services to the email validation application 102. The custom backend component 124 may execute on a server instance of the web application 104.

At a high level, during operation of the system 100, the email validation application 102 validates the draft email 116 before the draft email 116 is sent, and the web application 104 sends the draft email 116 if the draft email 116 is validated by the email validation application 102.

Figure 2:
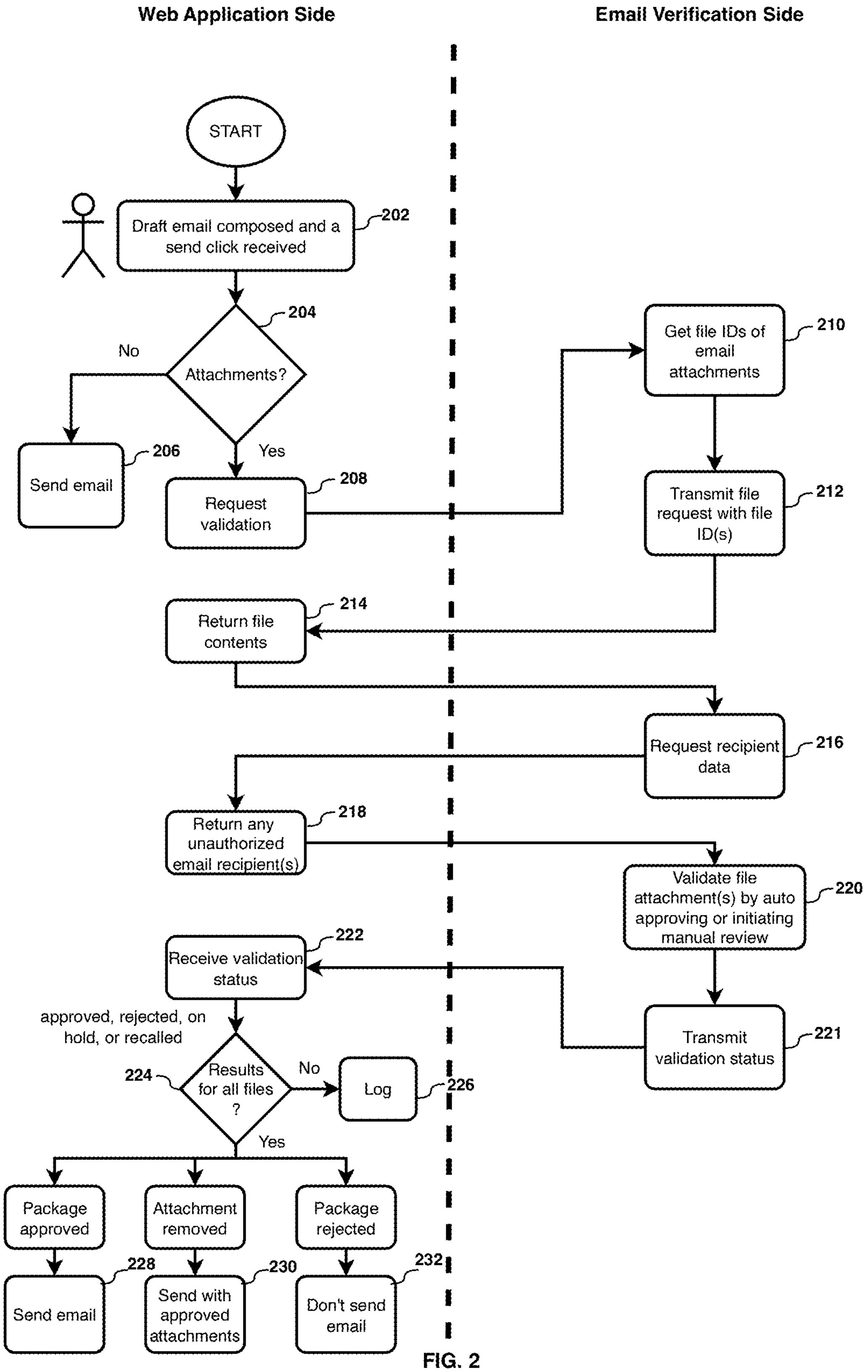
FIG. 2 illustrates a flow diagram of example logic of the system.

FIG. 2 illustrates a flow diagram of example logic of the system 100 shown in FIG. 1. The logic may include additional, different, or fewer operations than shown. In some examples, one or more operations may be executed in a different order than illustrated in FIG. 2.

Figure 3:
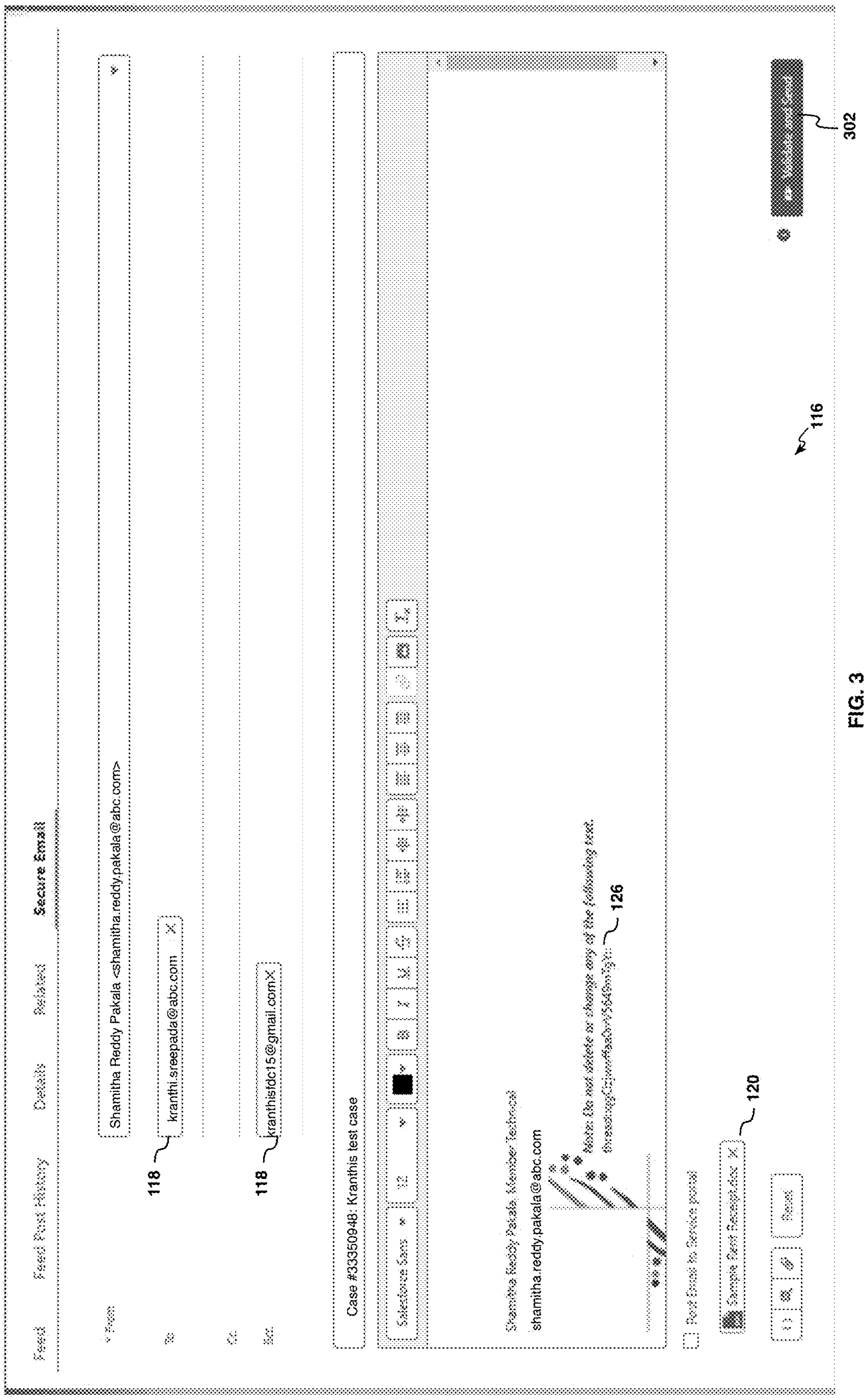
FIG. 3 illustrates an example of a graphical user interface generated by the custom email composer.

Operations may begin by the custom email composer 122 composing 202 the draft email 116 at the emailer's browser 108 based on user input 148. FIG. 3 illustrates an example of a graphical user interface (GUI) generated by the custom email composer 122. In the illustrated example, the draft email 116 includes two email recipients: the email recipient 118 in the "To" line, and the email recipient 118 in the "Bcc" line. The email recipient 118 in the "Bcc" line is a gmail account, and the email recipient 118 in the "To" line is a corporate email account. If the custom email composer 122 receives a click on a send button in the user input 148, such as a click on a "validate and send" button 302 shown in FIG. 3, operations may continue.

Figure 4:
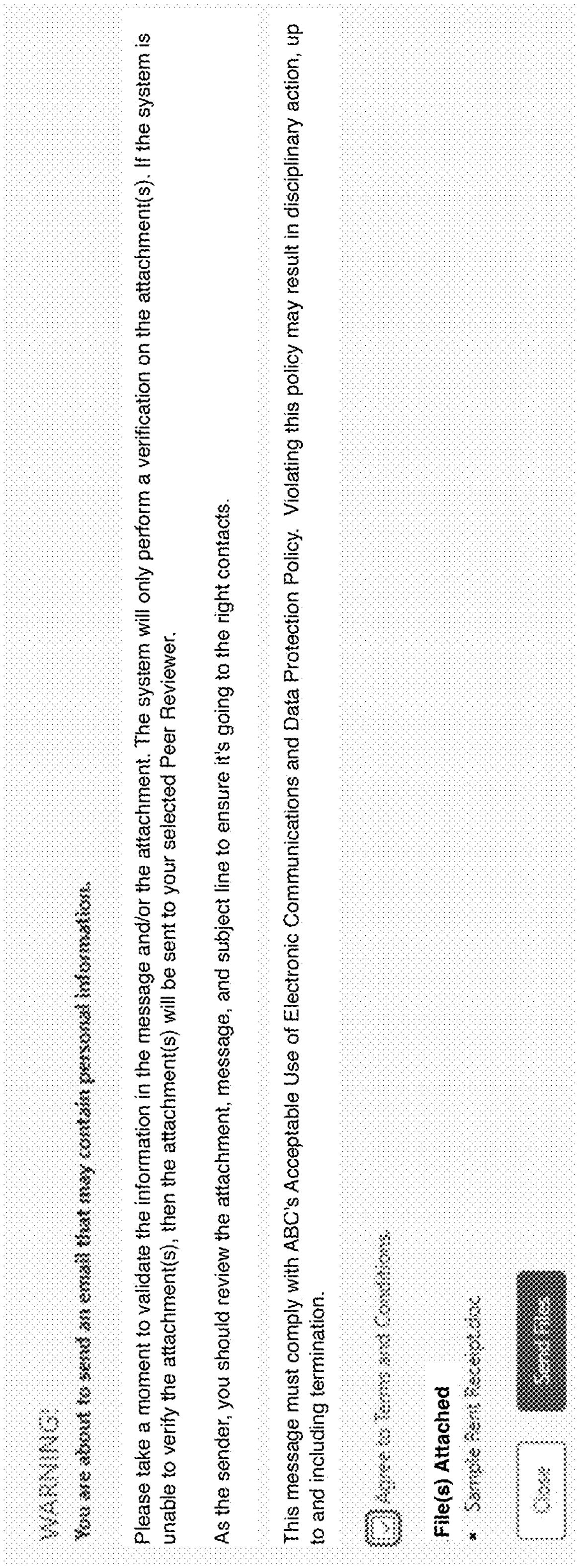
FIG. 4 illustrates an example of a warning dialog box that warns users to verify that the draft email is correct before proceeding.

In some examples, the custom email composer 122 may be the same as the standard email composer provided in the web application 104 except that in the custom email composer 122, an intercept point is provided where a validation request 134 may be transmitted from the custom email composer 122 to the email validation application 102. Alternatively, the custom email composer 122 may have additional differences from the standard email composer. For example, the custom email composer 122 may open a warning dialog box to warn users to verify that the draft email 116 is correct before proceeding. FIG. 4 illustrates an example of a warning dialog box 302 that warns users to verify that the draft email 116 has the proper contents, the proper file attachment(s) 120, and/or the proper recipients before proceeding. In some examples, the code for the custom email composer 122 may be included in a standard version of the web application 104, but merely be custom configured to interact with the email validation application 102 as described herein.

Figure 5:
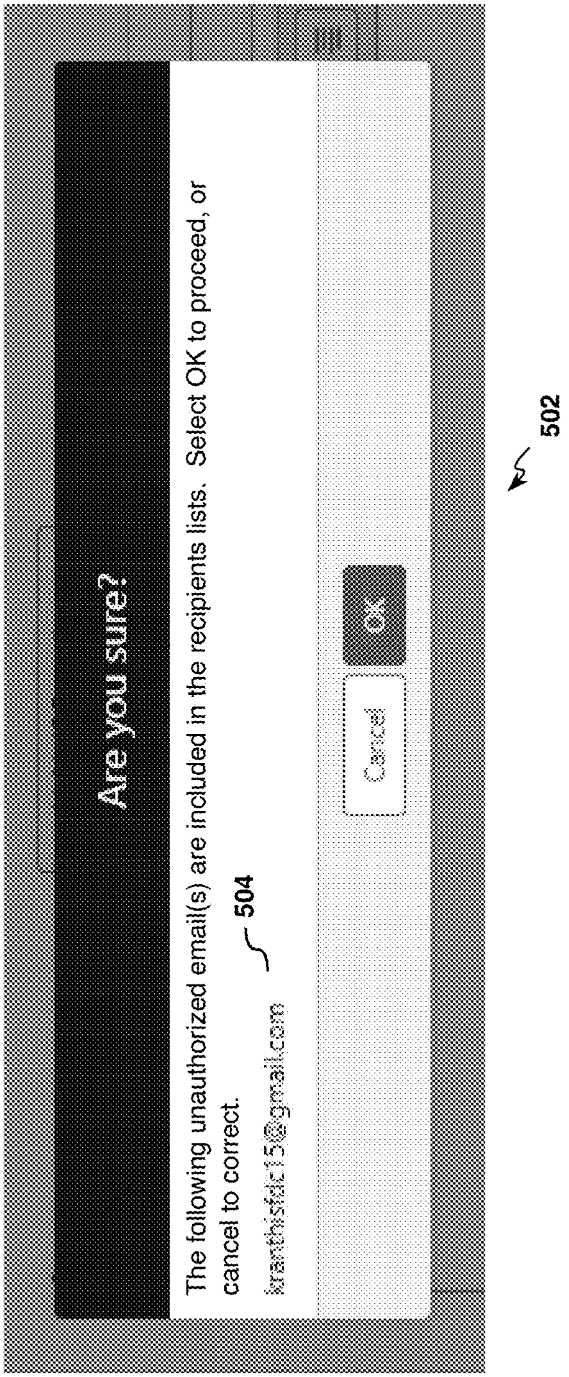
FIG. 5 illustrates an example in which the custom email composer generates a dialog box identifying any unauthorized email recipient.

In some examples, such as the example illustrated in FIG. 2, the custom email composer 122 performs one or more validations of its own. The custom email composer 122 validates each email recipient 118 to determine if any is an unauthorized email recipient. FIG. 5 illustrates an example in which the custom email composer 122 generates a dialog box 502 identifying any unauthorized email recipient 504 and asking the user if the user wants to proceed despite the existence of the unauthorized email recipient 504. The web application 104, for example, the custom email composer 122, may apply one or more rules to determine if the email recipient 118 is unauthorized. For example, one rule may be any email address of the email recipient 118 that does not match the domain name of the customer with the issue being tracked by the web application 104 is unauthorized. In other words, if the email recipient 118 is an authorized contact, then the contact may be part of the same account from which email is being sent.

Referring again to FIG. 3, the draft email 116 may include, and/or be associated with, a context identifier 126. The context identifier 126 may be any identifier that directly or indirectly identifies the issue activity log 114 that is associated with the issue the customer is having. The context identifier 126 may be said to indirectly identify the issue and/or the associated issue activity log 114 if the custom email composer 122, the custom backend component 124, and/or any other component of the web application 104 may identify the issue and/or the associated issue activity log 114 from the context identifier 126. For example, if the web application 104 is SALESFORCE, then the context identifier 126 may be a case identifier (CaseId) and/or an email identifier 142 (emailMessageId). Alternatively, or in addition, the context identifier 126 in SALESFORCE may be a RefID or an email threading token (ThreadId), which is an identifier the web application 104 uses for mapping emails to cases. In any case, the draft email 116 is associated with the context identifier 126 (for example, via the email threading token), and the context identifier 126 identifies the issue activity log 114, directly or indirectly. As explained further below in detail, the email validation application 102 may receive the context identifier 126 from the custom email composer 122 and subsequently cause the issue activity log 114 associated with the context identifier 126 to be updated with a validation status 140 of the draft email 116.

Returning to the example in FIG. 2, operations continue by the custom email composer 122 checking 204 if the draft email 116 has a file attachment 120. This is because, in this example, the email validation application 102 only validates the draft email 116 if the draft email 116 has file attachment(s) 120. If the draft email 116 does not have any file attachment(s) 120, then the custom email composer 122 may cause the draft email 116 to be sent 206. Alternatively, if the draft email 116 has the file attachment 120, then the custom email composer 122 may request 208 the email validation application 102 to validate the draft email 116.

The custom email composer 122 may request 208 validation of the draft email 116 by transmitting a validation request 134 to the email validation application 102.

The validation request 134 may be an HTTP request that supplies the email validation application 102 with information which the email validation application 102 may use to complete the validation. For example, the validation request 134 may include the context identifier 126. In some examples, the validation request 134 may include, for each file attachment 120 of the draft email 116, a file identifier 128 that identifies the file attachment 120.

The custom email composer 122 may initiate the validation request 134 by opening a new browser window to a URL directed to the email validation application 102. An example of the URL may be:

https://emailvalidationapp.com/
EmailValidator?caseId=5002300000Cj6eSAAR&
emailMessageId=0D52300000tTI4QCAW&
fileId=06923000001gZM0AAM,
06923000001gZLIAAM The validation request 134 may include a HTTP POST or GET method addressed to the URL. The values passed in the validation request 134 may be included in the URL or in the body of the HTTP request. Alternatively, in some examples, the validation request 124 may include a deep link to the email validation application 102, and the custom email composer 122 may initiate the validation request 134 by causing an app identified by the deep link (a URL) to open.

Opening a new browser window may avoid restrictions imposed by the browser to avoid cross-site scripting attacks. However, with proper configuration of the web application 104, other implementations of the HTTP request may be used. In one such example implementation, the validation request 134 may not necessarily be initiated by opening a new browser window. Instead, the validation request 134 may be a Representational State Transfer Application Programming Interface (REST API) call. In some examples, the web application 104 and the email validation application 102 may be hosted in the same domain, which may avoid browser restrictions imposed to avoid cross-site scripting attacks.

In response to the validation request 134, the email validation application 102 may validate the draft email 116. Validating the draft email 116 may involve one or more operations. For example, validating the draft email 116 may comprise validating the file attachment(s) 120 of the draft email 116.

In the example shown in FIG. 2, validating the file attachment(s) 120 includes the email validation application 102 getting 210 the file identifier 128 for each of the file attachment(s) 120 of the draft email 116. Getting 210 the file identifier 128 for each of the file attachment(s) 120 may include reading the file identifier 128 for each of the file attachment(s) 120 from the validation request 134 received from the web application 104. Validating the file attachment(s) 120 further includes fetching file contents 130 from the web application 104 by transmitting 212 a file request 136 from the email validation application 102 to the web application 104, where the file request 136 includes the file identifier 128 for a corresponding one of the file attachment(s) 120. The file request 136 may include only one file identifier, where the email validation application 102 transmits a separate file request for each of file attachment(s) 120. Alternatively, the file request 136 may include the file identifier(s) 128 for all the file attachment(s) 120 of the draft email 116 so the email validation application 102 only needs to transmit one file request even if there are multiple file attachments 120. In response to the file request(s) 136, the web application 104 may return 214 the file contents 130 to the email validation application 102. The non-customized version of the web application 104 may implement an API, such as a REST API, that returns the file contents 130 when provided the file identifier 128. Alternatively, or in addition, the custom backend component 124 may implement an API that returns the file contents 130 when provided the file identifier 128.

Validating the file attachment(s) 120 and/or validating the draft email 116 may further include transmitting 216 a recipient request 138 to the web application 104 from the email validation application 102 to identify the email recipient(s) 118. In the example illustrated in FIG. 2, the file attachment(s) 120 will need a review by a human if the draft email 116 includes any unauthorized email recipients. The human may want to see who the unauthorized email recipients are before approving the draft email 116 to be sent. As indicated above, the web application 104 may apply one or more rules to determine if any email recipient 118 is unauthorized. In response to the recipient request 138, the web application 104 may return 218, and the email validation application 102 may receive, the email recipient(s) 118. In the illustrated example, the custom backend component 124 of the web application 104 receives the recipient request 138 and returns 214 the email recipient(s) 118. In other examples, the non-customized version of the web application 104 receives the recipient request 138 and returns 214 the email recipient(s) 118. In some examples, the email recipient(s) 118 returned 214 may be limited to only the unauthorized email recipients. In other examples, the email recipient(s) 118 returned may include all the email recipients, and any unauthorized email recipients may be identified as unauthorized.

The recipient request 138 may include the email identifier 142 that identifies the draft email 116. The web application 104 and/or the custom backend component 124 may use the email identifier 142 included in the recipient request 138 to find the draft email 116 and the email recipient(s) 118 of the draft email 116. The email identifier 142 may be included in the validation request 134 transmitted to the email validation application 102. Alternatively, or in addition, the email validation application 102 may obtain the email identifier 142 from the context identifier 126 by transmitting, to the custom backend component 124, the context identifier 126 with the recipient request 138 or with a request for the email identifier 142.

In some examples, validating the file attachment(s) 120 and/or validating the draft email 116 may include transmitting a customer request (not shown) from the email validation application 102 to the web application 104 to obtain information about the customer having the issue associated with the issue activity log 114. The customer request may include a customer identifier 132 and/or the context identifier 126. In response to the customer request, the email validation application 102 may receive information about the customer, such as a customer name. The customer identifier 132 may be initially included in the validation request 134.

In some examples, the email validation application 102 may generate a web page that is displayed in the emailer's browser 108 in response to receiving the validation request 134. The web page may provide a user of the emailer's browser 108 with information about the email validation process. As described above, the email validation application 102 may obtain the email recipient(s) 118 of the draft email 116, the file contents 130 of the file attachment(s) 120.

Figure 6:
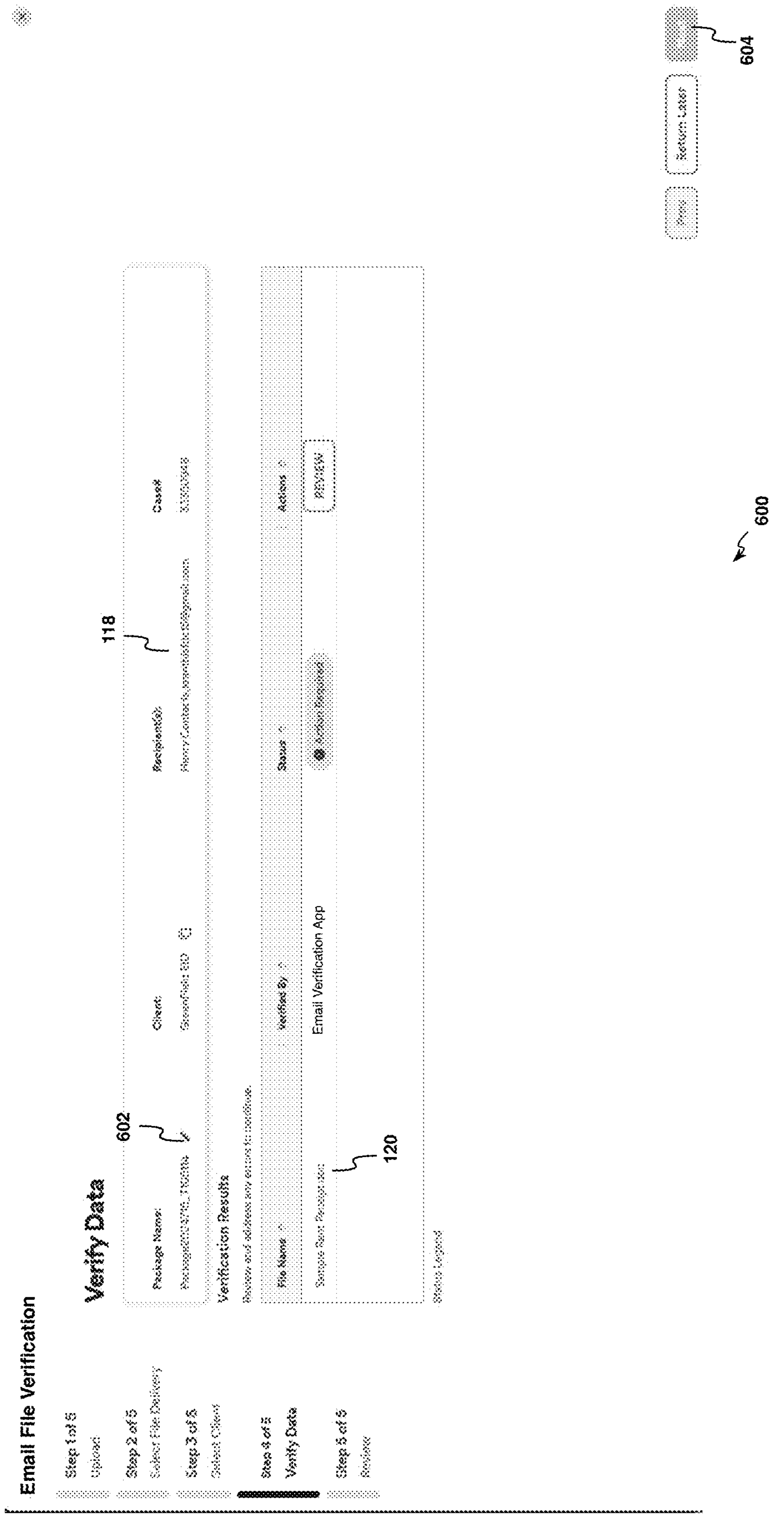
FIG. 6 illustrates an example of a web page generated in response to receiving a validation request.

The web page may provide information about the email recipient(s) 118, the file contents 130, and/or customer information. In some examples, the web page may provide customer information. FIG. 6 illustrates an example of a web page 600 generated in response to receiving the validation request 134. The web page 600 enables a user who composed the draft email 116 to review the file attachment(s) 120 and the email recipient(s) 118 before proceeding by pressing a "Next" button 604. In some examples, the draft email 116 and the file attachment(s) 120 may be presented as a package 602 for review.

Figure 7:
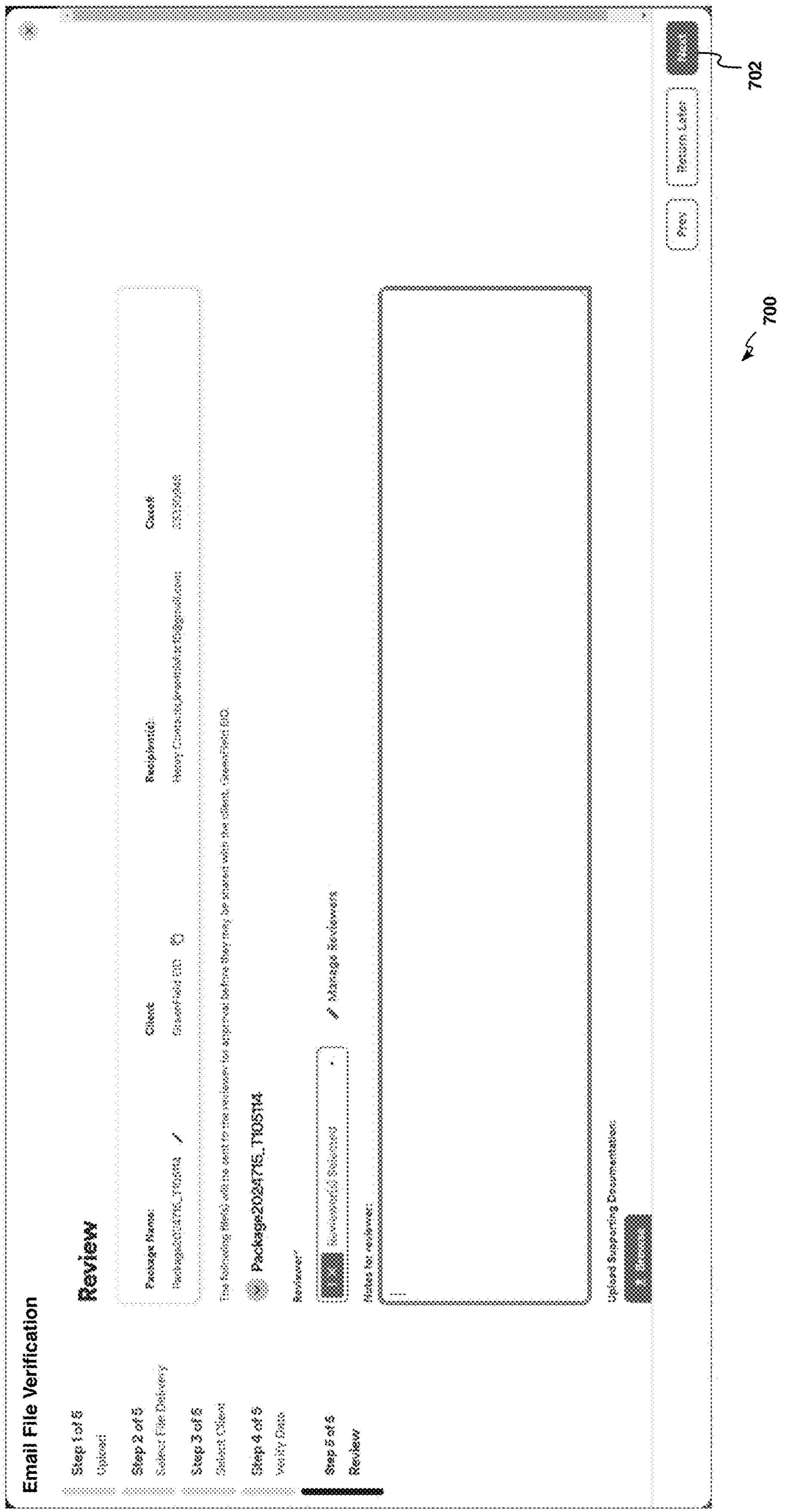
FIG. 7 illustrates an example of a web page generated to manage reviewers of the draft email.

FIG. 7 illustrates an example of a web page 700 generated to manage reviewers of the draft email 116. The web page 700 shown in FIG. 7 may be reached after the "Next" button 604 is pressed on the web page 600 shown in FIG. 6. The web page 700 to manage reviewers may enable the emailer to leave notes and/or supporting documents for the reviewer(s).

Figure 8:
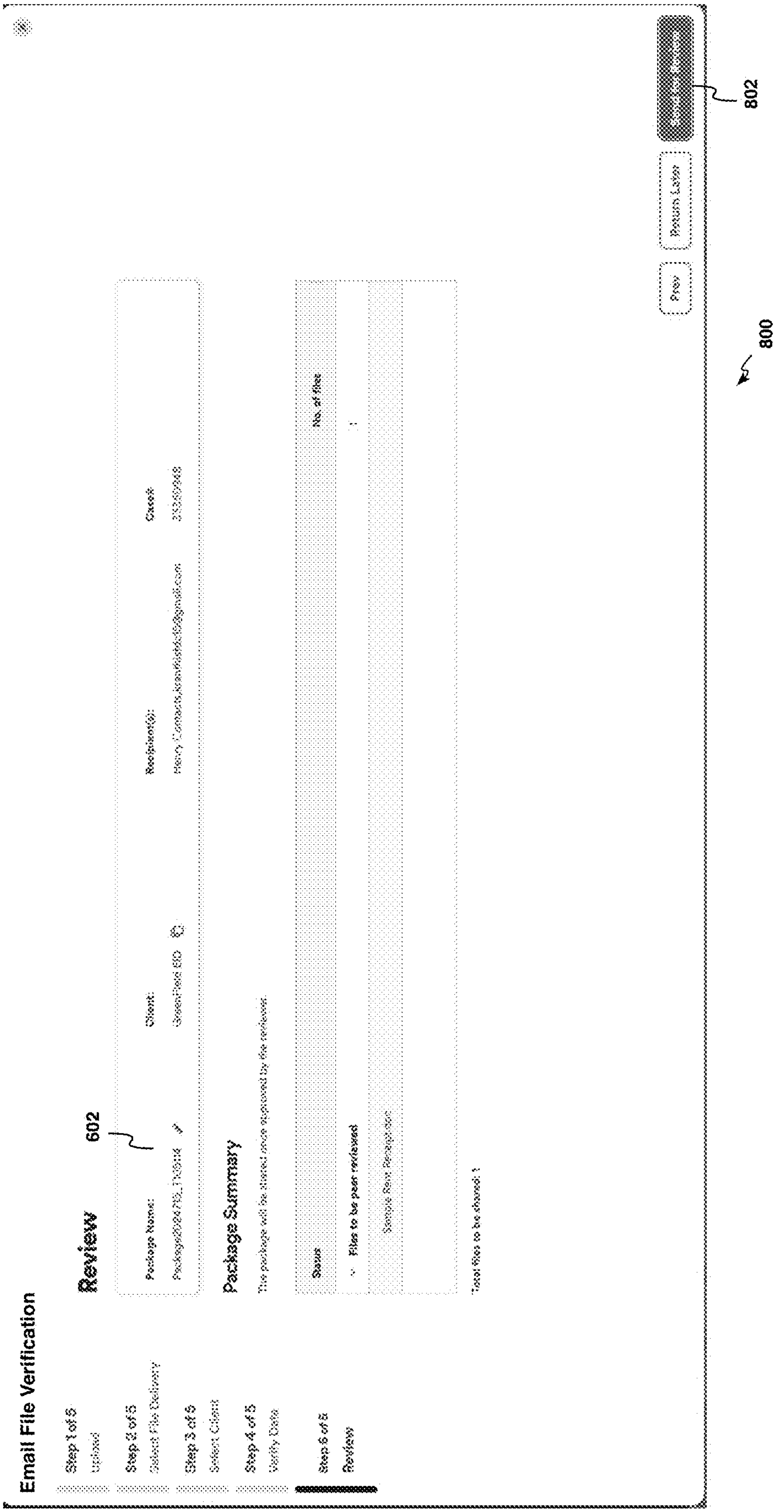
FIG. 8 illustrates an example of a web page that enables submission of a package for review.
Figure 9:
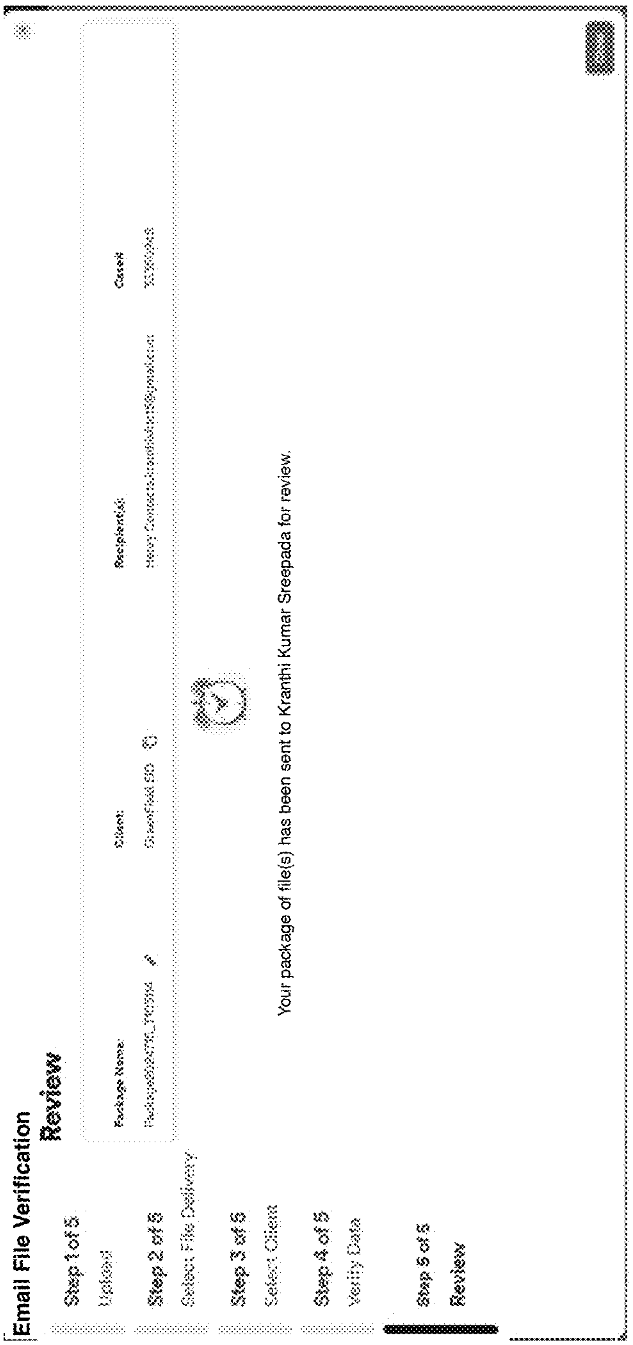
FIG. 9 illustrates an example of a web page shown in the emailer's browser after the "Send for Review" button shown in FIG. 8 is selected.

FIG. 8 illustrates an example of a web page 800 that enables submission of the package 602 for review. The web page 800 shown in FIG. 8 may be reached after the "Next" button 702 is pressed on the web page 700 shown in FIG. 7. In response to receiving a selection of a "Send for Review" button 802 shown in FIG. 8, the email validation application 102 may proceed with further validating the draft email 116. FIG. 9 illustrates an example of a web page 900 shown in the emailer's browser 108 after the "Send for Review" button 802 shown in FIG. 8 is selected.

In some examples, validating the file attachment(s) 120 of the draft email 116 may include validating the file contents 130 of the file attachment(s) 120. For example, the file contents 130 may be scanned for viruses, personally identifiable information (PII), and/or sensitive personal information (SPI), such as social security numbers and federal employer ID numbers.

In the example illustrated in FIG. 2, validating 220 the file attachment(s) 120 includes auto approving the draft email 116 or initiating a manual review of the draft email 116. Specifically, if all the email recipient(s) 118 are authorized, then the draft email 116 is auto approved; otherwise, if any of the email recipient(s) 118 are unauthorized, then a manual review of the draft email 116 is initiated. As explained above, the email validation application 102 may determine if any of the email recipient(s) 118 are unauthorized by, for example, transmitting the recipient request 138 to the web application 104 and receiving the email recipient(s) 118 in response. If a manual review of the draft email 116 is initiated, then a reviewer will indicate whether the draft email 116 is approved for sending.

Validating the draft email 116 may include ultimately transmitting 221 the validation status 140 from the email validation application 102 to the web application 104. The validation status 140 indicates a result of the validation of the draft email 116. The result may be a final result or an intermediate result. Examples of the result may include approved, rejected, on hold, and recalled. Approved may mean approved for sending. Rejected may mean not to be sent. On hold may mean the validation process is still ongoing and has not completed. For example, on hold may indicate that the draft email 116 is on hold pending a review. Recalled may mean the draft email 116 is not to be sent because the emailer decided against sending the draft email 116. The validation status 140 may include the context identifier 126 in addition to the result of the validation request 134.

The validation status 140 may include the result of the validation of the draft email 116 on a per file attachment basis. In other words, transmitting 221 the validation status 140 may include transmitting the validation status 140 for each file attachment 120 of the draft email 116. Alternatively, or in addition, the validation status 140 may include the result of the validation of the draft email 116 overall. In some examples, a separate validation status 140 may be transmitted for each corresponding one of the file attachment(s) 120. Alternatively, one validation status 140 may be transmitted that includes the results of the validation of each corresponding one of the file attachment(s) 120.

Operations may continue by the custom backend component 124 receiving 222 the validation status 140. In response, the custom backend component 124 may check 224 if the results for the validation of all the file attachment(s) 120 have been received yet. For example, the custom backend component 124 may check in the validation status 140 just received and in any previously received validation status(es). If the results of the validation of all the file attachment(s) 120 have been received and/or any is on hold, then the custom backend component 124 may write 226 the validation status 140 in the issue activity log 114 identified by the context identifier 126 or in some other entity persisted in the web database 112. Alternatively, if the results for the validation of all the file attachment(s) 120 has been received, operations may proceed in a manner that depends on the results of the validation. Examples of how operations may proceed based on the results of the validation are shown in FIG. 2.

Specifically, if the draft email 116 including the file attachment(s) 120 were all approved—for example, the entire package 602 was approved—then the custom backend component 124 may send 228 the draft email 116 with the file attachment(s) 120.

Alternatively, if the draft email 116 was approved but at least one file attachment 120 is rejected, then the custom backend component 124 may remove rejected file attachment(s) 120 from the draft email 116 and send 230 the draft email 116 with only the file attachment(s) 120 that are approved.

Alternatively, if the draft email 116, any of the file attachment(s) 120, and/or the package 602 is recalled, then the custom backend component 124 may not send 232 the draft email 116.

In summary, operations may end with the web application 104 sending the draft email 116 in response to the validation status 140 indicating the draft email 116 is validated. In the interim, an indication that the draft email 116 has not yet been validated may be written by the web application 104 to the issue activity log 114 in some examples. In some examples, the web application 104, such as the custom backend component 124, may write to the issue activity log 114 indicating that the draft email 116 was sent.

Figure 10:
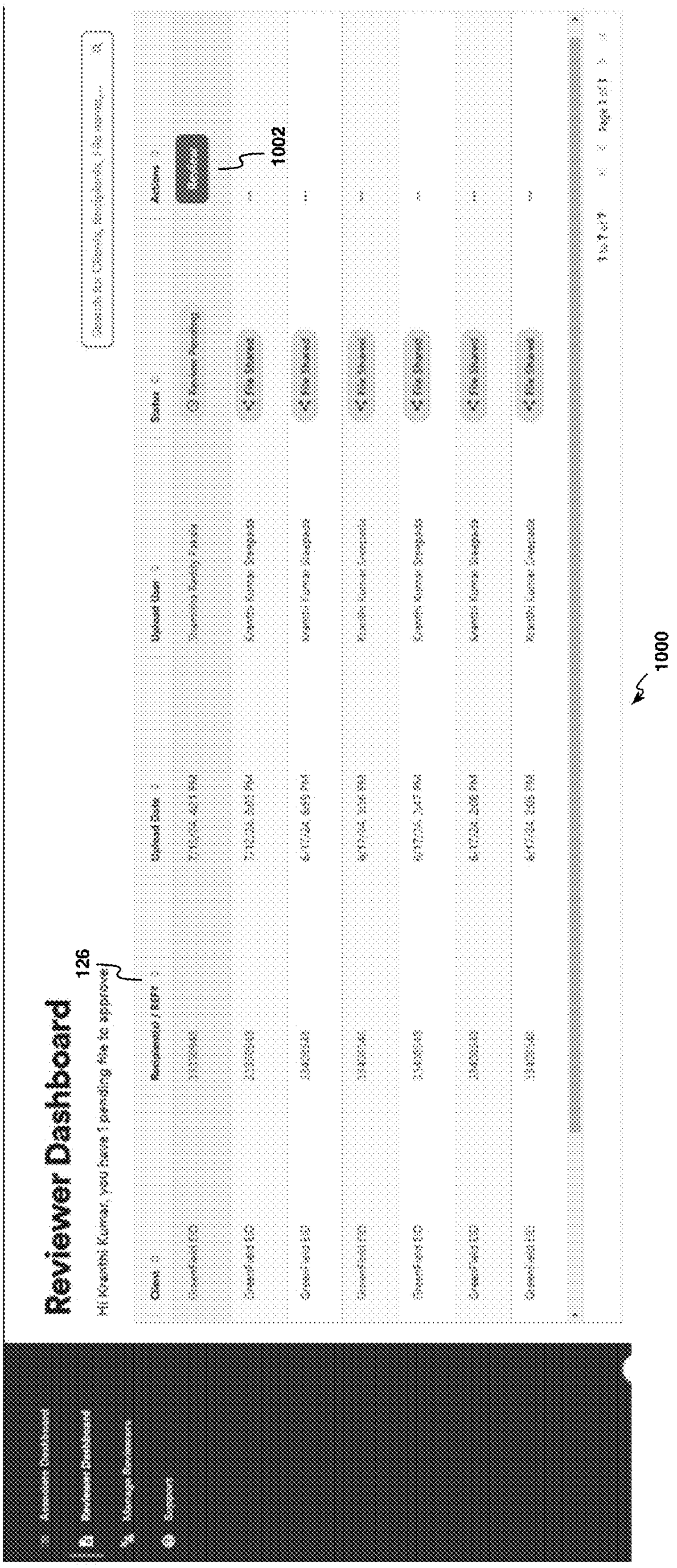
FIG. 10 illustrates an example of a web page that lists emails to be reviewed and/or that have been already reviewed.
Figure 11:
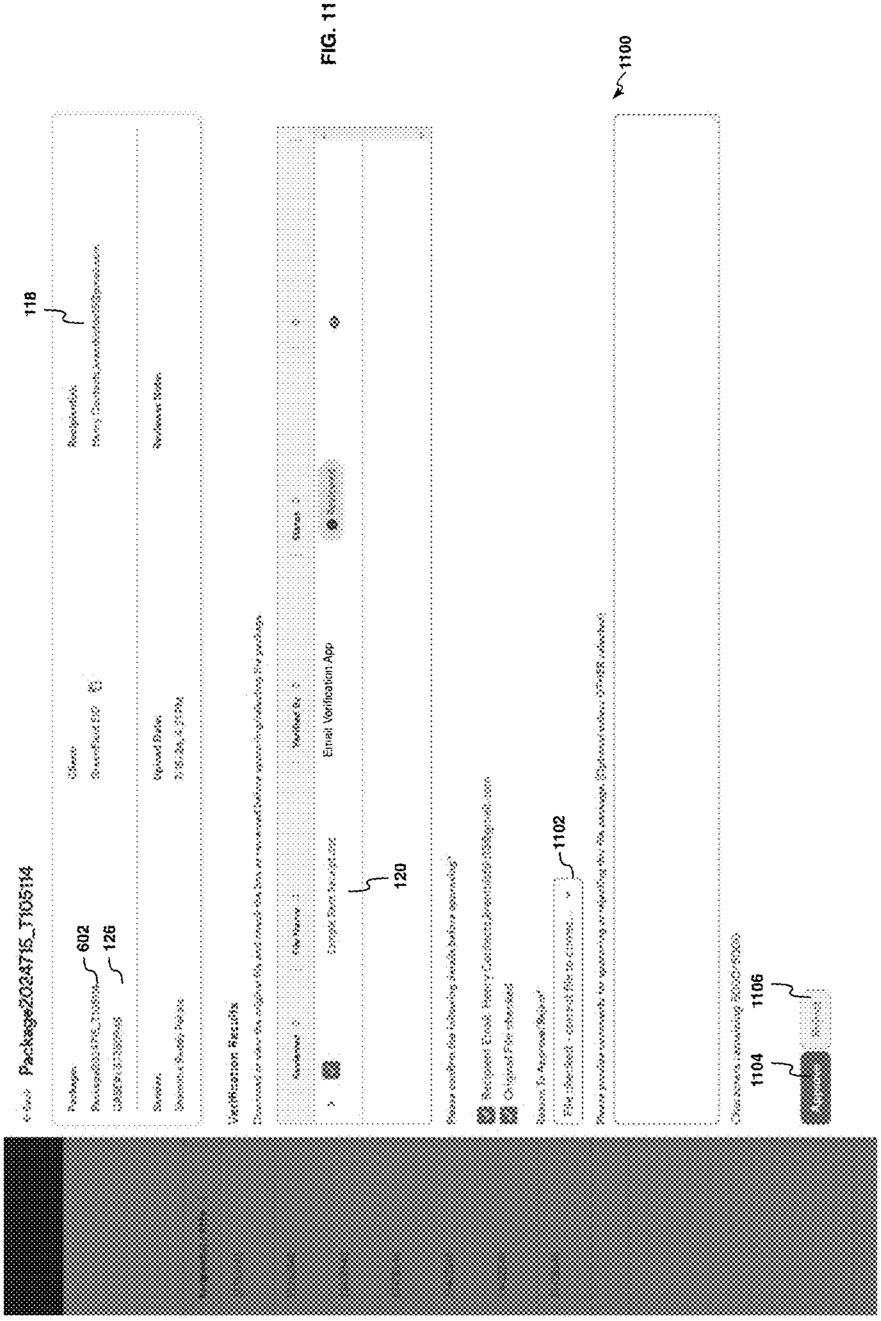
FIG. 11 illustrates an example of a web page that enables the reviewer to review the draft email in the package.
Figure 12:
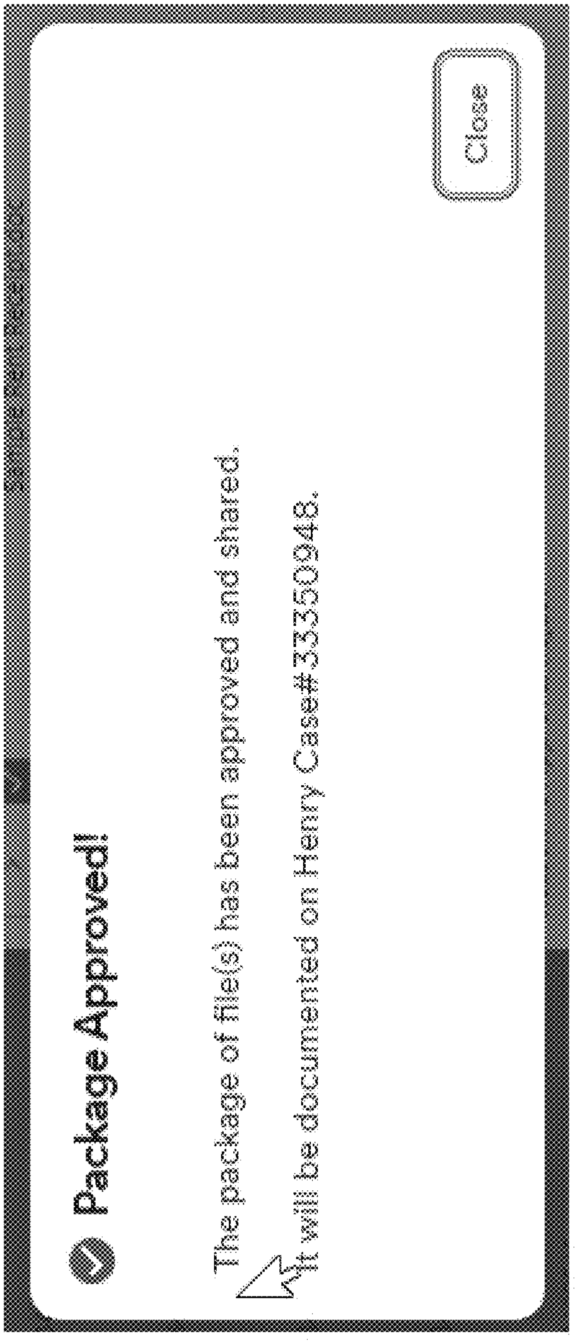
FIG. 12 illustrates an example of a dialog box indicating that the draft email was approved.

In examples where a reviewer manually reviews the draft email 116, the email validation application 102 may generate one or more web pages that the reviewer uses to review the draft email 116. The reviewer may interact with the web pages in the reviewer's browser 110. FIGS. 10-12 illustrate some examples of such web pages.

FIG. 10 illustrates an example of a web page 1000 that lists emails to be reviewed and/or that have been already reviewed. Each is identified by the context identifier 126 for the corresponding email. The draft email 116 to be reviewed (in other words, validated), may be reviewed by clicking a review button 1002.

FIG. 11 illustrates an example of a web page 1100 that enables the reviewer to review the draft email 116 in the package 602. The reviewer may view the file attachment(s)

120. The reviewer may provide a reason 1102 for approving or rejecting the draft email 116. The reviewer may approve or reject the draft email 116 by selecting the approve button 1104 or reject button 1106. FIG. 12 illustrates an example of a dialog box indicating that the draft email 116 was approved. After the draft email 116 is approved or rejected, the email validation application 102 may transmit the validation status 140 with the results of the review to the custom backend component 124 as described above.

As explained above, in response to receipt of the validation status 140, the web application 104, such as the custom backend component 124, may send the draft email 116 and write to the issue activity log 114 indicating that the draft email 116 was sent, or alternatively, not send the draft email 116 if the reviewer rejected the draft email 116.

Figure 13:
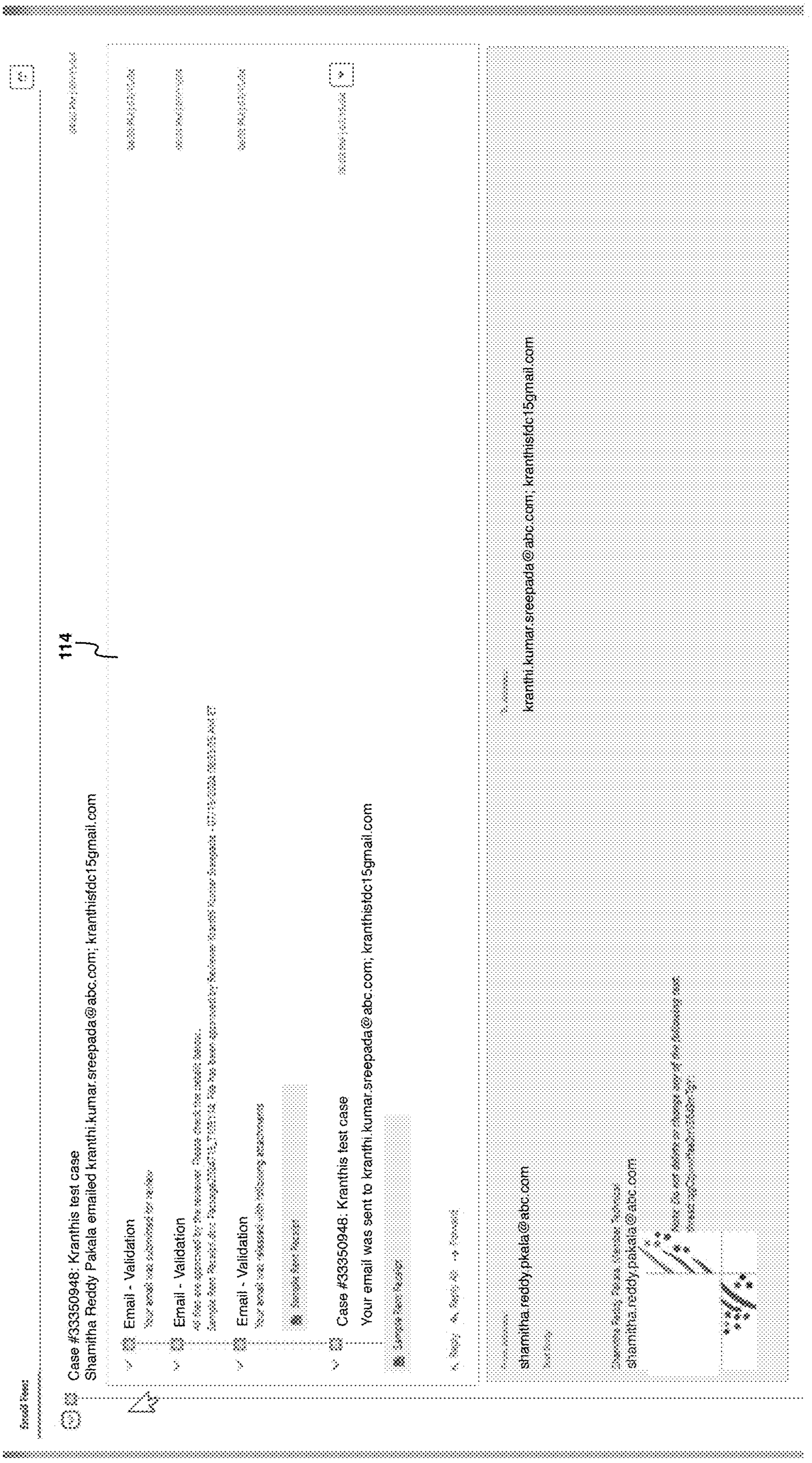
FIG. 13 illustrates an example of the issue activity log being displayed in the emailer's browser.

The issue activity log 114 may be viewable via the web application 104. FIG. 13 illustrates an example of the issue activity log 114 being displayed in the emailer's browser 108. In particular, the web application 104 may be configured to cause the issue activity log 114 to be displayed. In some examples, the custom email composer 122 of the web application 104 may be configured to cause the issue activity log 114 to be displayed. In FIG. 13, issue activity log 114 shows the status of the validation process over time.

Figure 14:
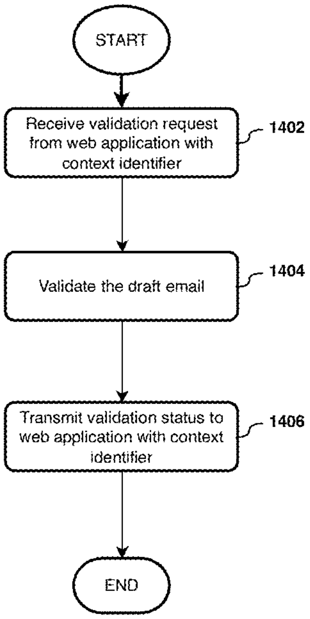
FIG. 14 illustrates a flow diagram of an example the logic of the system.

FIG. 14 illustrates a flow diagram of an example the logic of the system 100. The logic may include additional, different, or fewer operations. The operations may be executed in a different order than illustrated in FIG. 14.

Operations may begin with receipt 1402 of the validation request 134 from the web application 104. The validation request 134 may include an HTTP request or a deep link comprising the context identifier 126 that identifies the issue activity log 114 viewable via the web application 104.

The operations may proceed to validate 1404 the draft email 116 in response to the validation request 134. Even if validation may require an intervening manual review of the draft email 116 by a human in some examples, enabling or initiating the manual review means that the draft email 116 is validated "in response to" the validation request 134 despite manual input being required to complete the validation.

Operations may complete with a transmission 1406 of the validation status 140 from the email validation application 102 to the web application 104. The validation status includes the context identifier 126 and a result of the validation request 134, where the result of the validation request 134 indicates if the draft email 116 is to be sent by the web application 104.

The system 100 may include more, fewer, or different components than shown in FIG. 1. For example, the system 100 may include only the email validation application 102. In another example, the system may include the email validation application 102, the custom email composer 122, and the custom backend component 124.

The email validation application 102 may be any application that may validate the draft email 116 in response to the validation request 134, and that may provide the results of the validation in the validation status 140. The validation performed by the email validation application 102 may include confirming whether the draft email 116 conforms to one or more rules. Alternatively, or in addition, the validation performed by the email validation application may include obtaining approval from a human or an artificial intelligence agent to send the draft email 116. In the examples described in connection with FIG. 2 to FIG. 13, the email validation application 102 is a web application. However, in other examples, the email validation application 102 may be an application that receives the validation request 134 as a call to a REST API implemented by the email validation application 102 and that sends the validation status 140 as a call to a REST API implemented by the custom backend component 124 without the email validation application 102 being a web application that serves web pages.

The network 106 be any collection of transmission links over which data between computing nodes may be exchanged. For example, the network 106 may include a local area network (LAN), a wired network, a wireless network, a wireless local area network (WLAN), a WI-FI® network (WI-FI is a registered trademark of Wireless Ethernet Compatibility Alliance, Inc. of Austin, Texas), a personal area network (PAN), a wide area network (WAN), the Internet, an Internet Protocol (IP) network, any other communications network, or any combination thereof.

The emailer's browser 108, the reviewer's browser 110, and any other browser that accesses the web application 104 and/or the email validation application 102 may include any type of web browser. A web browser renders web pages from HTML (Hyper Text Markup Language).

The web database 112 may include any electronic collection of information and any type of database. The information may be organized so that the information may be accessed, managed, and updated by a database management system. Examples of the web database 112 may include a Structured Query Language (SQL) database, a NoSQL database, a graph database, a Relational Database Management System (RDBMS), an object-oriented database, an extensible markup language (XML) database, a file system, memory structures, or any other organization and storage mechanism. The database may use any type of memory and structure, such as a random-access memory (RAM), a read-only memory (ROM), an erasable programmable read-only memory (EPROM), flash memory, optical memory, magnetic (hard-drive or tape) memory or other memory device.

The draft email 116 may be any type of email that has been composed but not yet sent. Email may be any type of electronic mail, which is an electronic form of mail sent from one computer to another. Email may be sent and/or accessed by any suitable protocol, such as SMTP, POP3, and IMAP.

The email recipient 118 of the draft email 116 may be any contact indicated in the draft email 116 as being an intended recipient. Examples of the email recipient 118 may include any email address included in the "to," "cc," and/or the "bcc" line(s).

The file attachment 120 may be any file that is indicated in the draft email 116 as being intended to be sent with the draft email 116. In some examples, file attachment 120 may appear to be in the body of the draft email 116 when the draft email 116 is viewed. In other examples, the file attachment 120 may appear as an item separate from, but attached to, the draft email 116.

The custom backend component 124 may include custom code added to the standard version of the web application 104. Alternatively, the standard version of the web application 104 may implement all the functionality attributed to the custom backend component 124 herein. In such an example, the term "custom" does not mean that the custom backend component 124 must be modified in any way from the standard version of the web application 104. Instead, the term "custom backend component" merely refers to a collection of code that implements the features of the custom backend component 124. Similarly, if the standard version of the web application 104 implements all the functionality attributed to the custom email composer 122 herein, the term "custom email composer" merely refers to a collection of code that implements the features of the custom email composer 122.

The customer identifier 132 may be any value that identifies the customer associated with the issue for which the issue activity log 114 is created. Examples of the customer identifier 132 may include a customer number, a customer name, or any other value that identifies the customer in the web application 104 and/or in the web database 112.

The file request 136, the recipient request 138, and/or the validation status 140 may be in the form of an HTTP request. In some examples, the file request 136, the recipient request 138, and/or the validation status 140 may be a REST API call. Alternatively, the file request 136, the recipient request 138, and/or the validation status 140 may be any other remote procedure call.

The email identifier 142 may be any value that identifies the draft email 116 in the web application 104 and/or in the web database 112. For example, the email identifier 142 may be a number, an alphanumeric value, a text value, or any other type of value.

The component of the email validation application 102 that includes the code to process the validation request 134 may be an email validator 144. The component of the email validation application 102 that includes the code to interact with the reviewer's browser 110 may be an email reviewer 146.

Figure 15:
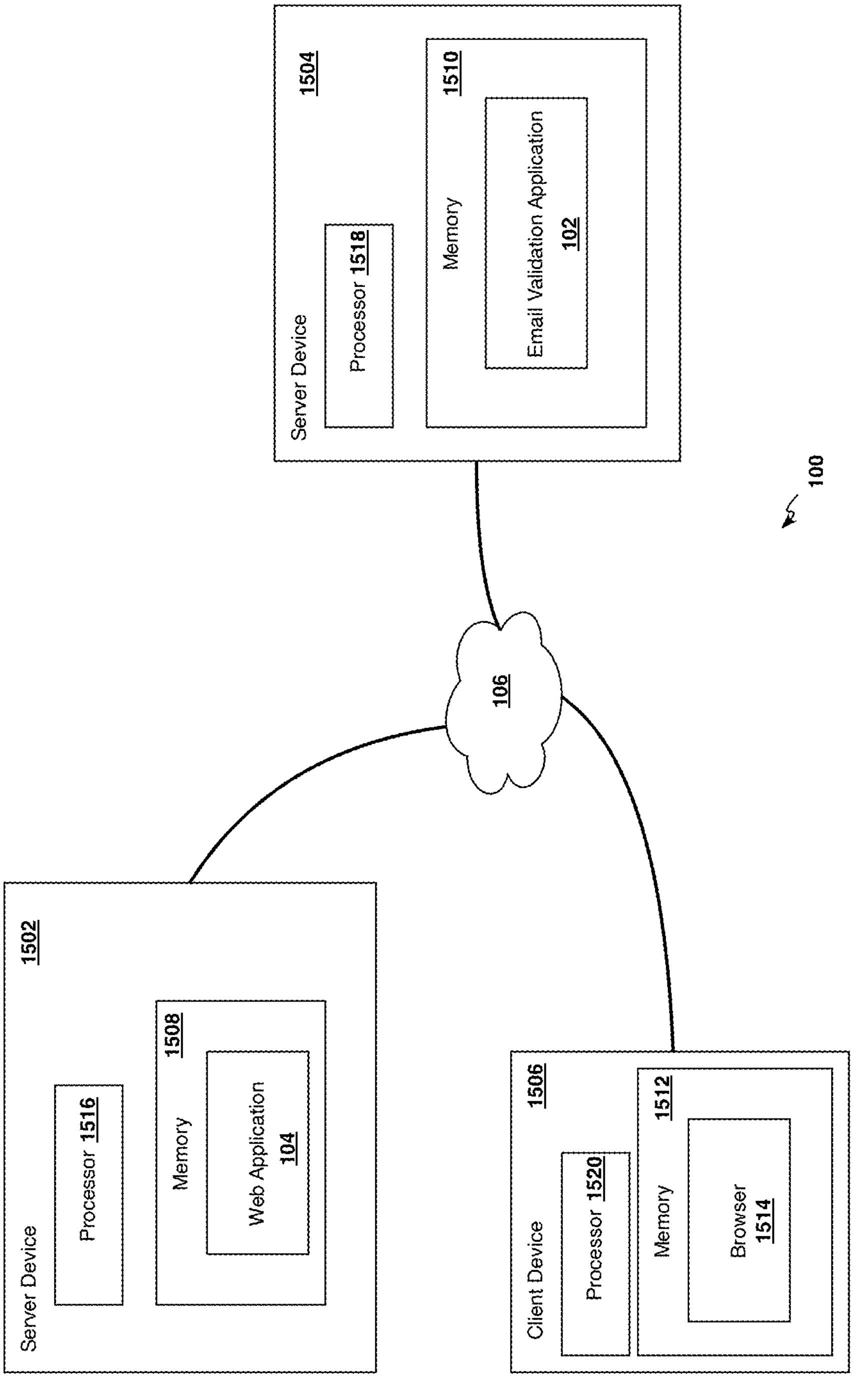
FIG. 15 illustrates an example of the system that includes three devices.

FIG. 15 illustrates an example of the system 100 that includes three devices: a first server device 1502, a second server device 1504, and a client device 1506. The web application 104 is in included in a memory 1508 of the first server device 1502, the email validation application 102 is included in a memory 1510 of the second server device 1504, and a browser 1514—such as the emailer's browser 108 and/or the reviewer's browser 110—is included in a memory 1512 of the client device 1506. The first server device 1502, the second server device 1504, and the client device 1506 may be in communication with each other via the network 106. The first server device 1502, the second server device 1504, and the client device 1506 may each include a corresponding processor 1516, 1518, and 1520.

In each device 1502, 1504, and 1506, the corresponding processor 1516, 1518, and 1520 may be in communication with the memory 1508, 1510, and 1512 of the device 1502, 1504, and 1506. In some examples, the processor 1516, 1518, and 1520 may also be in communication with additional elements, such as a display (not shown) and/or an input device (not shown). Examples of the processor 1516, 1518, and 1520 may include a general processor, a central processing unit, a microcontroller, a server, an application specific integrated circuit (ASIC), a digital signal processor, a field programmable gate array (FPGA), and/or a digital circuit, analog circuit.

The processor 1516, 1518, and 1520 may be one or more devices operable to execute logic. The logic may include computer executable instructions or computer code embodied in the memory 1508, 1510, and 1512 or in other memory that when executed by the processor 1516, 1518, and 1520, cause the processor to perform the features implemented by the logic. The computer code may include instructions executable with the processor 1516, 1518, and 1520.

The memory 1508, 1510, and 1512 may be any device for storing and retrieving data or any combination thereof. The memory 1508, 1510, and 1512 may include non-volatile and/or volatile memory, such as a random access memory (RAM or DRAM), solid state memory, flash memory, a read-only memory (ROM), an erasable programmable read-only memory (EPROM), and flash memory. Alternatively, or in addition, the memory 1508, 1510, and 1512 may include an optical, magnetic (hard-drive), or any other form of data storage device.

The system 100 may be implemented in many different ways. Each module, such as the email validation application 102, the web application 104, and custom email composer 122, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include memory hardware, such as a portion of the memory 1508, 1510, and 1512, for example, that comprises instructions executable with the processor 1516, 1518, and 1520 or other processor to implement one or more of the features of the module. When any one of the modules includes the portion of the memory that comprises instructions executable with the processor, the module may or may not include the processor. In some examples, each module may just be the portion of the memory 1508, 1510, and 1512 or other physical memory that comprises instructions executable with the processor 1516, 1518, and 1520 or other processor to implement the features of the corresponding module without the module including any other hardware.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable storage medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various examples have been described, it will be apparent to those of ordinary skill in the art that many more examples and implementations are possible. Accordingly, the examples and implementations described herein are descriptive, but not the only possible examples and implementations.

The subject-matter of the disclosure may also relate, among others, to the following aspects:

A first aspect relates to a method of integrating an email validation application with a web application, the method comprising: composing, by a custom email composer of the web application, a draft email, the draft email associated with a context identifier, the context identifier identifying an issue activity log; requesting, by the custom email composer, validation of the draft email by transmitting a validation request to the email validation application, wherein the validation request includes the context identifier; validating the draft email by the email validation application in response to the validation request; transmitting a validation status from the email validation application to the web application, the validation status including the context identifier and a result of the validation request; updating, by the web application, the issue activity log with the validation status in response to receipt of the validation status; and sending the draft email by the web application in response to the validation status indicating the draft email is validated.

A second aspect relates to the method of aspect 1, wherein the issue activity log is a case.

A third aspect relates to the method of any preceding aspect, wherein validating the draft email comprises validating a file attachment of the draft email.

A fourth aspect relates to the method of any preceding aspect, wherein validating the draft email comprises fetching a file from the web application by transmitting a file request to the web application from the email validation application, the file request including a file identifier supplied in the validation request.

A fifth aspect relates to the method of any preceding aspect, wherein validating the draft email comprises: transmitting a recipient request to the web application from the email validation application; receiving an email recipient in response to the recipient request, the email recipient indicated in the draft email as an intended recipient and the email recipient being an unauthorized recipient; and indicating in the validation status that the draft email is on hold pending a review.

A sixth aspect relates to the method of any preceding aspect, wherein transmitting the validation status comprises transmitting the validation status for each attachment of the draft email.

A seventh aspect relates to the method of any preceding aspect, wherein a custom backend component of the web application receives the validation status and updates the issue activity log.

An eighth aspect relates to a system to integrate an email validation application with a web application, the system comprising: a custom email composer of the web application, the custom email composer configured to create a draft email, the draft email associated with a context identifier, wherein the context identifier identifies an issue activity log; the email validation application configured to validate the draft email in response to a validation request received from the custom email composer, wherein the validation request includes the context identifier; and a custom backend component of the web application, the custom backend component configured to write a validation status to the issue activity log in response to receipt of the validation status from the email validation application, the custom backend component further to configured to send the draft email in response to the validation status indicating the draft email is validated.

A ninth aspect relates to the system of aspect 8, wherein the issue activity log is a case.

A tenth aspect relates to the system of any preceding aspect, wherein the web application is configured to cause the issue activity log to be displayed.

An eleventh aspect relates to the system of any preceding aspect, wherein the validation status is a second validation status, wherein the email validation application is configured to transmit a first validation status to the custom backend component before the second validation status, wherein the first validation status indicates the validation of the draft email has not completed.

A twelfth aspect relates to the system of aspect 11, wherein the custom backend component is configured to write the first validation status to the issue activity log.

A thirteenth aspect relates to the system of any preceding aspect, wherein the draft email includes the context identifier.

A fourteenth aspect relates to the system of any of the aspects 8 to 12, wherein the context identifier is an email threading token.

A fifteenth aspect relates to a non-transitory computer readable storage medium comprising computer executable instructions, the computer executable instructions executable by a processor, the computer executable instructions comprising: instructions executable to receive a validation request from a web application, wherein the validation request is a request to validate a draft email, the validation request includes a context identifier that identifies an issue activity log viewable via the web application; instructions executable to validate the draft email in response to the validation request; and instructions executable to transmit a validation status from an email validation application to the web application, the validation status including the context identifier and a result of the validation request, the result of the validation request indicating if the draft email is to be sent by the web application.

A sixteenth aspect relates to the non-transitory computer readable storage medium of aspect 15, wherein the draft email includes the context identifier.

A seventeenth aspect relates to the non-transitory computer readable storage medium of any preceding aspect further comprising instructions executable to validate a file attachment of the draft email.

An eighteenth aspect relates to the non-transitory computer readable storage medium of any preceding aspect further comprising instructions executable to generate a web page for a reviewer to review of the draft email.

A nineteenth aspect relates to the non-transitory computer readable storage medium of any preceding aspect, wherein the issue activity log is a case, and the context identifier is a case identifier.

A twentieth aspect relates to the non-transitory computer readable storage medium of any preceding aspect further comprising instructions executable to update the issue activity log with the validation status.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of integrating an email validation application with a web application, the method comprising:

composing, by an email composer of the web application, a draft email, the draft email associated with a context identifier, the context identifier identifying an issue activity log, wherein the issue activity log is collection of information about a customer issue;

requesting, by the email composer, validation of the draft email by transmitting a validation request to the email validation application, wherein the validation request is a request to validate any intended email recipients and/or a file attachment of the draft email, wherein the validation request includes the context identifier;

validating the draft email by the email validation application in response to the validation request;

transmitting a validation status from the email validation application to the web application, the validation status including the context identifier and a result of the validation request;

updating, by the web application, the issue activity log with the validation status in response to receipt of the validation status; and sending the draft email by the web application in response to the validation status indicating the draft email is validated.

2. The method of claim 1, wherein the issue activity log is a case.

3. The method of claim 1, wherein validating the draft email comprises validating the file attachment of the draft email.

4. The method of claim 1, wherein validating the draft email comprises fetching a file from the web application by transmitting a file request to the web application from the email validation application, the file request including a file identifier supplied in the validation request.

5. The method of claim 1, wherein validating the draft email comprises:

transmitting a recipient request to the web application from the email validation application;

receiving an email recipient in response to the recipient request, the email recipient indicated in the draft email as an intended recipient and the email recipient being an unauthorized recipient; and indicating in the validation status that the draft email is on hold pending a review.

6. The method of claim 1, wherein transmitting the validation status comprises transmitting the validation status for each attachment of the draft email.

7. The method of claim 1, wherein a custom backend component of the web application receives the validation status and updates the issue activity log.

8. A system to integrate an email validation application with a web application, the system comprising:

an email composer of the web application, the email composer configured to create a draft email, the draft email associated with a context identifier, wherein the context identifier identifies an issue activity log, wherein the issue activity log is collection of information about a customer issue;

the email validation application configured to validate the draft email in response to a validation request received from the email composer, wherein the validation request is a request to validate any intended email recipients and/or a file attachment of the draft email, and wherein the validation request includes the context identifier; and a custom backend component of the web application, the custom backend component configured to write a validation status to the issue activity log in response to receipt of the validation status from the email validation application, the custom backend component further configured to send the draft email in response to the validation status indicating the draft email is validated.

9. The system of claim 8, wherein the issue activity log is a case.

10. The system of claim 8, wherein the web application is configured to cause the issue activity log to be displayed.

11. The system of claim 8, wherein the validation status is a second validation status, wherein the email validation application is configured to transmit a first validation status to the custom backend component before the second validation status, wherein the first validation status indicates the validation of the draft email has not completed.

12. The system of claim 11, wherein the custom backend component is configured to write the first validation status to the issue activity log.

13. The system of claim 8, wherein the draft email includes the context identifier.

14. The system of claim 8, wherein the context identifier is an email threading token.

15. A non-transitory computer readable storage medium comprising computer executable instructions, the computer executable instructions executable by a processor, the computer executable instructions comprising:

instructions executable to receive a validation request from a web application, wherein the validation request is a request to validate any intended email recipients and/or a file attachment of a draft email, wherein the validation request includes a context identifier that identifies an issue activity log viewable via the web application, wherein the issue activity log includes a list of activities associated with a customer issue;

instructions executable to validate the draft email in response to the validation request; and instructions executable to transmit a validation status from an email validation application to the web application, the validation status including the context identifier and a result of the validation request, the result of the validation request indicating if the draft email is to be sent by the web application.

16. The non-transitory computer readable storage medium of claim 15, wherein the draft email includes the context identifier.

17. The non-transitory computer readable storage medium of claim 15 further comprising instructions executable to validate the file attachment of the draft email.

18. The non-transitory computer readable storage medium of claim 15 further comprising instructions executable to generate a web page for a reviewer to review of the draft email.

19. The non-transitory computer readable storage medium of claim 15, wherein the issue activity log is a case, and the context identifier is a case identifier.

20. The non-transitory computer readable storage medium of claim 15 further comprising instructions executable to update the issue activity log with the validation status.

* * * * *